United States Patent [19]

Piatt

[11] Patent Number: 4,763,138

[45] Date of Patent: Aug. 9, 1988

[54] COMPACT PRINTER HAVING AN INTEGRAL CUT-SHEET FEEDER

[75] Inventor: Michael J. Piatt, Enon, Ohio

[73] Assignee: Eastman Kodak Company, Rochester, N.Y.

[21] Appl. No.: 20,416

[22] Filed: Mar. 2, 1987

[51] Int. Cl.[4] .......................... G01D 15/24

[52] U.S. Cl. .......................... 346/134; 400/662; 400/660.3

[58] Field of Search .......................... 346/134; 400/662, 624, 400/634, 660.3; 355/14 SH, 3 SH

[56] References Cited

U.S. PATENT DOCUMENTS 4,237,466 12/1980 Scranton .......................... 346/134

4,310,256 1/1982 Inoue .......................... 400/185

4,600,929 7/1986 Cardona .......................... 346/134

FOREIGN PATENT DOCUMENTS 59-35961 2/1984 Japan .......................... 400/662

*Primary Examiner*—H. Broome

*Assistant Examiner*—Mark Reinhart

*Attorney, Agent, or Firm*—John D. Husser

[57] ABSTRACT

Printer apparatus of the kind having a housing, a print zone and a serial printing device for printing along line sectors of print media that are successively advanced into and out of the print zone includes an integral subsystem for handling discrete sheets of print media. This subsystem includes (a) transport member having a peripheral surface that is movable around an endless path past a sheet ingress zone, the print zone and a sheet agress zone; (b) a drive for moving the transport member surface around the endless path; (c) a sheet supply station formed within the housing and including a device for positioning the face of a sheet-stack adjacent the path of the transport member at a position upstream of the sheet ingress zone; and (d) engagement device for effecting periodic feeding engagements between the transport means and successive face sheets of a positioned stack. Preferred embodiments of the engagement device comprise (i) especially sized and configured feed/transport surfaces on a cylindrical platen or (ii) a platen drive cam sequencer for moving the sheet stack toward and away from the platen.

24 Claims, 6 Drawing Sheets

COMPACT PRINTER HAVING AN INTEGRAL CUT-SHEET FEEDER

BACKGROUND OF THE INVENTION

1. Field of the Invention

The present invention relates to printer apparatus of the kind wherein discrete print sheets are advanced portion by portion through a print zone by a print platen and more particularly to integrated constructions in such printer apparatus that enable automatic feeding of successive print sheets.

2. Background Art

With the increasing popularity of "personal" computers and word processors, there has developed a need for similarly "personal" printers of their output. To the extent that the computers and word processors become smaller in size and more portable, there is a commensurate desire that the output printers have the same characteristics. Various small size, dot matrix printers, which are capable of printing on cut-sheet, fanfold and tractor-feed media formats, are available. However, these printers generally require hand-insertion of each successive cut-sheet print medium.

Automatic sheet feeding accessories are available for use with such compact printers, but these devices are separate units from the printer and present several disadvantages. For example, these separate sheet feeders create bulk to the overall system, as well as making it aesthetically unpleasing. The separate feeder approach involves a separate motor, drive transmission and feed elements, causing it to be a costly system addition. Moreover, there must be separate umbilical lines coupling the printer and feeder, and "cords" are always a target for elimination.

From another viewpoint, the add-on sheet feeder approach requires troublesome operator activities when setting up the printing system and when changing between different types of print media, e.g. from discrete sheet to fanfold media. The add-on approach causes complexities in the sheet feed path, which can render the system subject to jams and misfeeds. Also from the functional viewpoint, the add-on approach requires an escape code from the host computer to initiate a sheet feed sequence. The use of this extra code is very inconvenient when utilizing some software packages, e.g. for word processing applications, that do not support such an extra code.

SUMMARY OF INVENTION

One significant purpose of the present invention is to provide a printer/feeder system which eliminates, or significantly, reduces, many of the above-described disadvantages of prior art add-on approaches. Thus, in one aspect the present invention provides a printer which embodies sheet feeding constructions in a compact, integral unit. In related aspects, the present invention provides integral printer/feeder constructions that are functionally improved, e.g. from the viewpoints of reliability and convenience of operation. In further aspects, the present invention provides printer/feeder constructions that are improved in regard to their mechanical and electrical simplicity, their costs of fabrication and their appearance and convenience of handling.

In one constitution, the present invention features in printer apparatus of the kind having a housing, a print zone and means for printing along line sectors of print media that are successively advanced into and out of the print zone, an improved subsystem for handling discrete sheets of print media. This subsystem includes (a) transport member having a peripheral surface that is movable around an endless path past a sheet ingress zone, the print zone and a sheet egress zone; (b) a drive for moving the transport member surface around the endless path; (c) a sheet supply station formed within the housing and including a device for positioning the face of a sheet-stack adjacent the path of the transport member at a position upstream of the sheet ingress zone; and (d) engagement device for effecting periodic feeding engagements between the transport means and successive face sheets of a positioned stack.

In one preferred constitution of the present invention the engagement device comprises an especially sized and configured cylindrical feed/transport platen.

BRIEF DESCRIPTION OF DRAWINGS

The subsequent description of preferred embodiments refers to the attached drawings wherein.

DETAILED DESCRIPTION OF PREFERRED EMBODIMENTS

Figure 1:
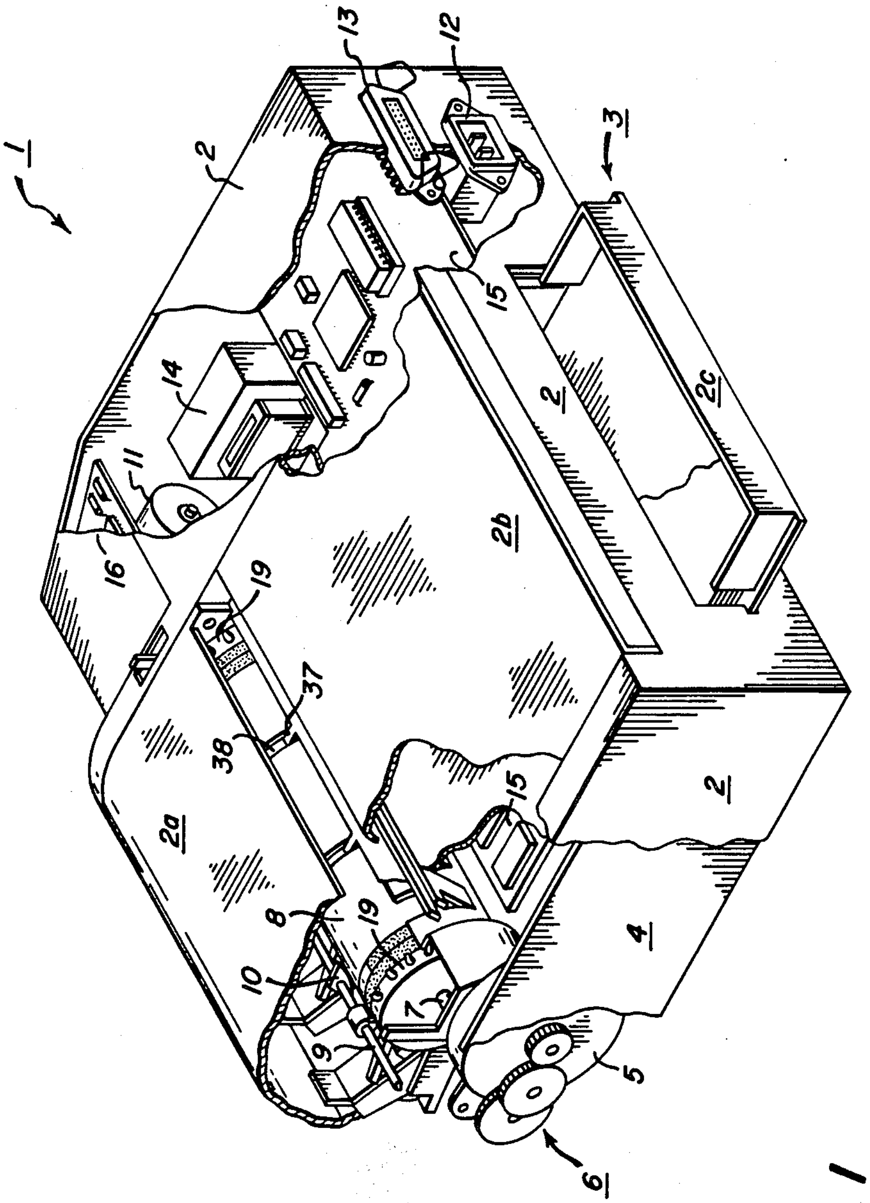
FIG. 1 is a perspective view, with portions broken away, showing one printer embodiment in accord with the present invention.

The printer 1 shown in FIG. 1 is an embodiment of the present invention employing ink jet printing with insertable, drop-on-demand print/cartridges. While this printing technology is particularly useful for effecting the objects of the present invention, one skilled in the art will appreciate that many of the subsequently described inventive aspects will be useful in compact printers employing other printing approaches. The printer 1 has a housing 2, which encloses the operative printer mechanisms and electronics, and includes a pivotal front lid 2*a*, a pivotal rear lid 2*b* and a rear wall 2*c* of cassette drawer 3. Within the housing 2 is a main frame assembly (one wall 4 shown in FIG. 1) on which various components of the printer are mounted. Thus, a platen drive motor 5 is mounted to impart rotary drive through gear train 6 to a drive shaft 7 for a cylindrical platen 8 constructed in accord with one preferred embodiment of the invention, subsequently explained in more detail. Also mounted on the main frame assembly is a bail assembly 9 which is constructed to cooperate with platen 8 in accord with the present invention, as well as to support a print/cartridge carriage 10, which is shown in more detail in FIG. 2. Also shown in FIG. 1 are the printer's carriage drive motor 11, power and data input terminals 12, 13, power transformer means 14 and logic and control circuitry, which is disposed on one or more circuit boards 15. A control panel 16 for operator interface is disposed on the top front of the print housing.

Figure 2:
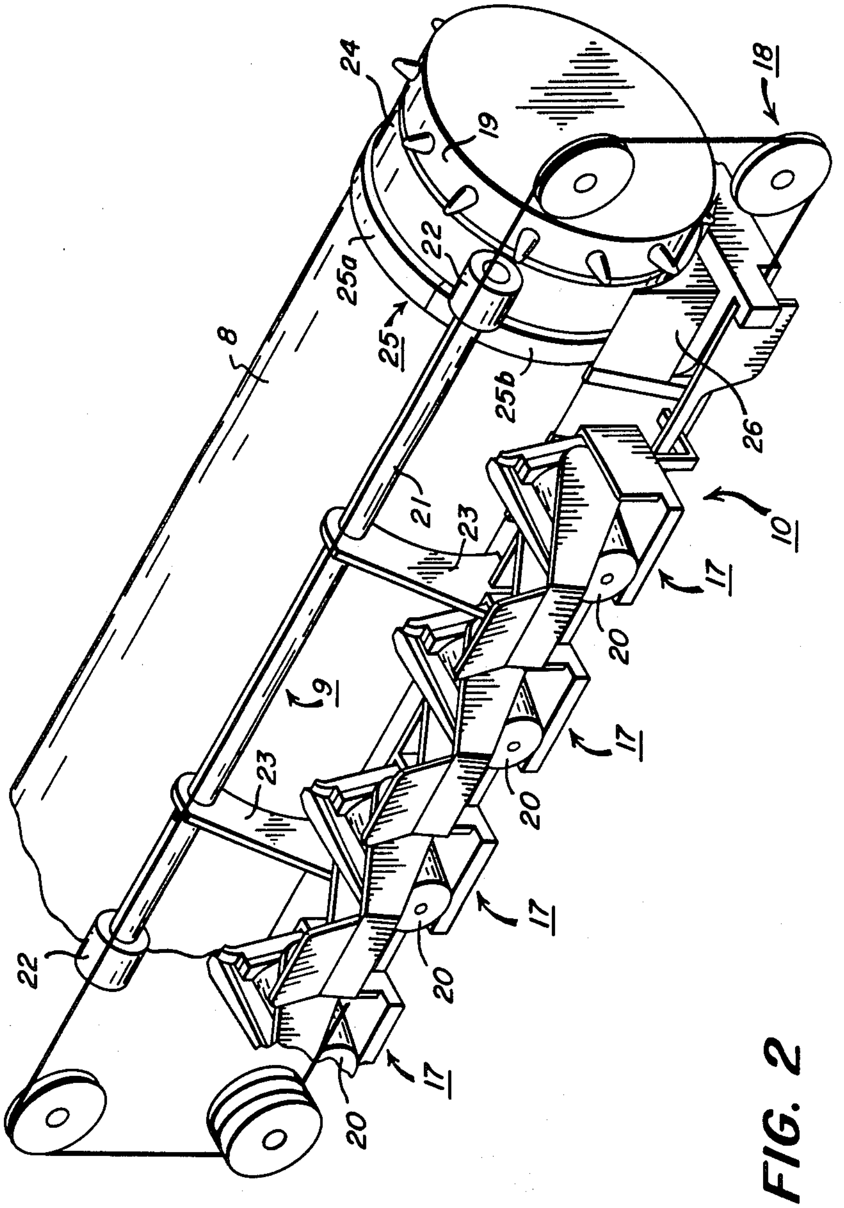
FIG. 2 is a perspective view, compressed in the axial dimension and having other portions exaggerated in scale to illustrate details of the print platen and print head carriage assembly of the FIG. 1 printer.

Referring to FIG. 2, the print/cartridge carriage 10 can be seen to comprise four nests 17 coupled for movement as a unit to translate across respective line segments of a print zone. Each of nests 17 is adapted to insertably receive, position and electrically couple a print/cartridge 20 in an operative condition within the printer. Such print/cartridges can be thermal drop-on-demand units that comprise an ink supply, a driver plate and an orifice array from which ink drops are selectively ejected toward the print zone in accord with data signals, e.g. transmitted through the printer logic from a data terminal such as a word processor unit. Both the print/cartridge construction and the positioning and coupling structures of nests 17 are described in more detail in U.S. application Ser. No. 945,134, filed Dec. 22, 1986, and entitled "Multiple Print/Cartridge Ink Jet Printer Having Accurate Vertical Interpositioning", by Piatt et al, which is incorporated herein by reference. However, other serial printing structures can be usefully employed in combination with the present invention. FIG. 2 also illustrates a carriage drive assembly 18, comprising a cable and pulley loop coupled to the motor 11 and to the carriage 10. Tractor feed wheels 19 mounted on the ends of platen 11 are used to advance tractor feed medium when printer 1 operates in that alternative printing mode.

Considering now the sheet feed constructions in accord with the present invention, the perspective illustration in FIG. 2 shows cooperative platen and carriage structures with non-scale sizes for more clear visualization of significant features. Specifically, platen and carriage assembly features have been axially compressed and the platen end features enlarged to show one preferred embodiment that enables platen rotation to effect the feeding of sheets from a supply stack, as well as transport of a fed sheet along the print path, from an ingress through the print zone and through a printer egress. Thus, the bail assembly 9 includes a shaft 21 which rotatably supports bail pressure rollers 22 near each end of the platen and which slidingly supports guide arms 23. As shown, the guide arms curve around the front platen periphery down into the zone of their attachment with other portions of carriage assembly 10. Axially inwardly from the tractor feed wheels at each end of the platen, there are constructed frictional transport bands 24, e.g. formed of a rubberized coating. Each of bands 24 extends around the entire platen periphery and is of substantially the same diameter as the platen 8. The frictional transport bands are respectively aligned with pressure rollers 22 so as to pinch paper therebetween in a manner that causes transmission of the platen rotation to a print sheet which has passed into their nip. Axially inwardly from each of transport bands 24 the platen comprises raised feed ring portions 25 that extend around the platen periphery. The feed ring portions extend above the platen surface, e.g. about 0.015", and each is divided into a rough surface sector *25a* and a smooth surface sector *25b*. The rough sectors of the two feed rings are at corresponding peripheral locations, as are their smooth sectors.

Also shown in FIG. 2 is a lower sheet guide member 26 which extends along the lower periphery of platen 8 from an ingress of the sheet feed path to a location contiguous the lower extensions of guide arms 23. Thus, portions 26 and 23 define means for guiding a fed sheet in close proximity to the platen 8, from the print path ingress into the nip of pressure roller 23.

Figure 3:
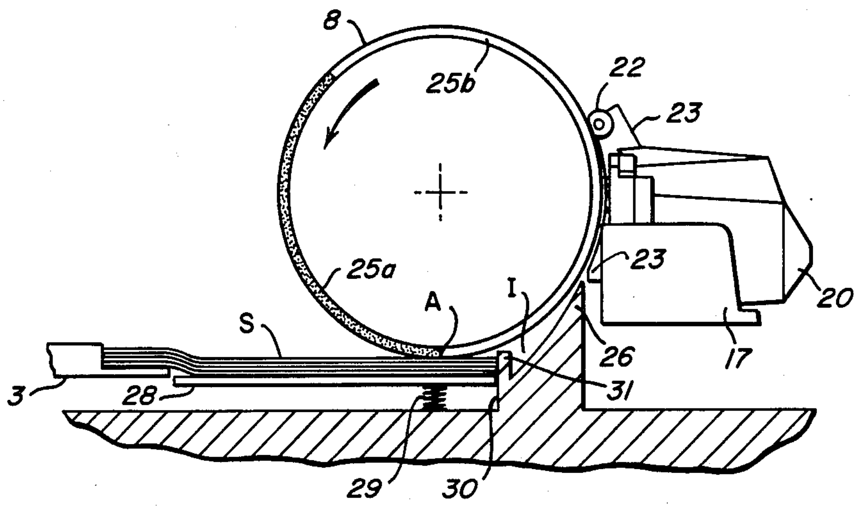
FIGS. 3–5 are schematic side views of the print platen and print head carriage assembly shown in FIG. 2, which illustrate their cooperation with the printer's sheet supply station.

Referring back to FIG. 1, it can be seen that the cassette drawer 3 is slidably mounted in the bottom of the printer for movement between a withdrawn location (for the insertion of a stack of print sheets) and a stack positioning location. As shown in FIG. 3, the front end of the stack S positioned by cassette 3 rests on a force plate 28 which is pivotally mounted at its rear end for up-down movement and is biased upwardly by spring means 29. The leading stack edge is indexed against sheet index plate 30 and buckler members 31 (shown in more detail in FIG. 6). The functions of the structural elements described above will be further understood by considering the sheet feeding and printing sequences of the printer 1 with reference to FIGS. 3–5. At the stage shown in FIG. 3, the platen 8 has been initialized to a start position. (This condition can be readily achieved by various means, e.g. depression of force plate 28, via its tab *28a*, while indexing the platen to the FIG. 3 orientation by detection of a mark on the platen end by a photodetector not shown.) In this condition the leading edges of the rough surface sectors *25a* of feed rings 25 are located at the contact point A with the top face sheet of a stack positioned by cassette 3. It is preferred that the contact zone A be located slightly rearwardly from the front edges of the stack, as shown in FIG. 3, to facilitate buckling separation of the top sheet when sheet feed commences.

Figure 4:
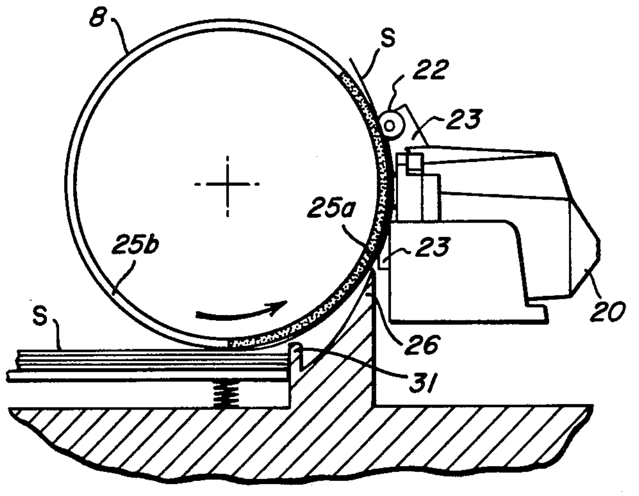

As the platen 8 rotates counterclockwise between the FIG. 3 and FIG. 4 conditions, the rough surface portions *25a* force the top stack sheet into contact with, and over, buckler elements 31, into the print path ingress I. The sequential engagements at contact zone A between successive rough surface portions *25a* and successive portions of the upwardly biased top sheet S drive the leading sheet edge along the print path defined by the guide means 26, 23 so that the leading edge of the sheet will move into the nip between pressure rollers 22 and transport bands 24. After the leading sheet edge has passed into the nip, the feed by rough surface portions *25a* is no longer required and, as illustrated in FIG. 4, the smooth portions *25b* can now exist at the contact zone. Feed of the print sheet continues to be provided by the rotation of the platen, now by virtue of the drive transmission at the nip of roller 22, as successive lines of information are printed by traversing print/cartridges 20.

Figure 5:
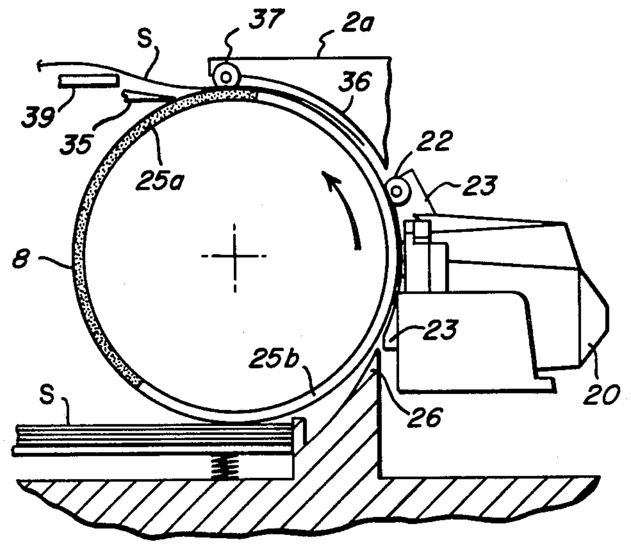
Figure 6:
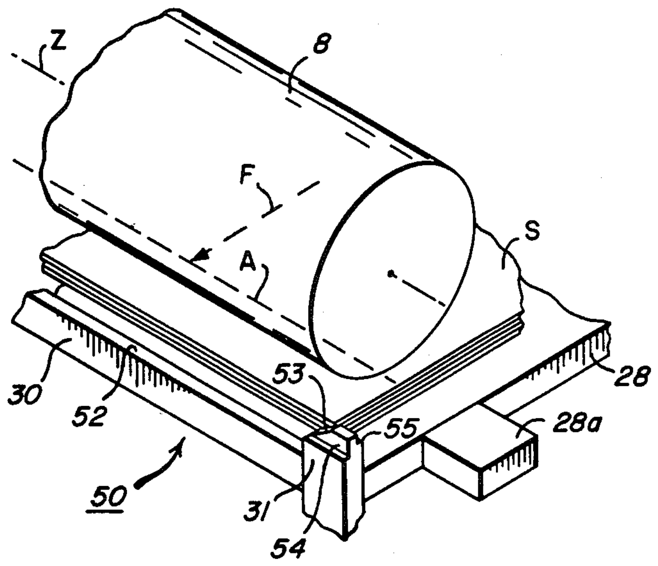
FIG. 6 is a perspective view showing preferred embodiments of sheet indexing and separating structure for cooperation with the print/feed platen of the FIG. 1 apparatus.

In the system illustrated in FIGS. 3–5, the drum makes two revolutions per sheet and, as shown in FIG. 5, toward the end of the second revolution, the trailing edge of a printed sheet S is egressing the nip of roller 22 and smooth portions *25b* are still passing through the contact zone. Thus, the next successive top sheet is not yet fed from the stack. When the rotation of platen 8 progresses back to the stage shown in FIG. 3 (completing its second revolution), the trailing end of the fed sheet has passed pressure roller 22 and the next sheet feeding and transport sequence is initiated.

As shown in FIG. 5, it is desirable for the housing top to embody guide structure 36 and additional pressure rollers 37, aligned with bands 24 so that a printed sheet is moved completely onto the output tray 39, revealed by opening lid *2b*. This structure is pivotal away from the drum with front lid *2a* to allow removal of a printed sheet if a job ceases at the FIG. 5 stage. As shown in FIG. 1 and FIG. 5, stripper fingers 37 are disposed within recesses 38 of platen 8 to assist in directing a sheet into the output tray when a series of sheets are printed successively. It can be seen that the described construction provides a compact and mechanically simple system for feeding and transporting sheets for the printer.

When one contemplates the disclosed concepts, it is realized that there are certain important dimensional relations for achieving the desired results, i.e. reliable feeding of sheets sequentially from the stack through the print zone and out of the print path, preferably with a predetermined space along the feed path between sheets. Desirably, the space between sheets is such that a leading sheet has been moved into the output tray before commencement of the next sheet feed. This avoids leaving a partially fed sheet in the print path at the completion of a given job. As will be described subsequently, the invention can be practiced with different constructions, e.g. different sizes of platens and different pressure roller locations; however, the following general parameters are highly preferred. First, the circumference of the platen is preferably a multiple or sub-multiple of the sum of "sheet feed length" plus a selected path length spacing between sheets, where the sheet feed length is the distance from the contact point A to the trailing sheet end. Second, it is important that the rough surface feed ring portions 25a have a circumferential extent sufficient to move the leading sheet edge into the bail roller/transport band nip or its equivalent. Third, the smooth surface portions 25b of the feed rings should be at the contact zone during the period between the time exit of the trailing edge of a fed sheet from the contact zone and the commencement of a next feed sheet. Desirably, the next fed sheet sequence commences after the preceding sheet completes a suitable exit (e.g. having its trailing edge pass beyond the bail roller nip).

The following design analysis will be useful to those skilled in the art for achieving the general design goals outlined above. In this analysis, reference is made to FIG. 7 and the following nomenclature is utilized:

$L_p$—Length of sheet to be fed through printer
$L_f$—Length of sheet from drum contact point to trailing end of sheet
$D_d$—Diameter of platen
$L_b$—Distance from drum contact point to sheet bucklers
$\alpha$—Angular distance from drum contact point to bail arm roller contact point (in degrees)
$\beta$—Angular distance of rubber gripper surface on platen (in degrees)
$\chi$—Angular distance from drum contact point to egress roller contact point (in degrees)
$\phi$—Angular position of platen (in degrees)
A—Drum contact point
B—First bail arm roller contact point
C—Egress roller contact point
n—Number of revolutions drum makes to get sheet out of paper cassette
k—The integer part of n; i.e. If n=3.15, k=3
j—The number of complete revolutions the printer makes before it starts feeding the next sheet
$\theta_1$—An angular factor of safety which defines an extra peripheral length of gripper surface behind the contact point when a leading sheet edge reaches the bail arm contact point
$\theta_2$—An angular factor of safety which defines the peripheral length of platen smooth surface provided under the trailing section of a fed sheet
$\theta_3$—An angular factor of safety which defines the peripheral length of smooth platen surface between contact point A and the rough platen surface lead edge at the time a fed sheet trailing edge is at the egress roller contact point To implement the sheet feeder concept of the invention, the above variables should be related in a specific way. Thus, the total length of the sheet to be fed will be equal to the length of the sheet ahead of and behind the drum contact point.

$$L_p = L_f + L_b \quad (1)$$

The sheet begins feeding when the rubber gripper surface first contacts the paper at the drum contact point. Since the sheet should be fed by the rubber gripping surface until it is under the bail arm roller, we can formulate the following equation:

$$\beta = \theta_1 + \left[\alpha - L_b\left(\frac{360}{\pi D_d}\right)\right] \quad (2)$$

Once the first sheet is under the first bail arm roller, this roller assumes the responsibility of feeding the sheet until it is nearly out of the printer.

As the first sheet leaves the stack it allows the second sheet to come in contact with the platen. Since it is desirable not to feed the second sheet into the printer until the first sheet has exited the printer, the platen smooth surface should be in contact with the second sheet when the first sheet exits the contact point A. If we use the point where the platen rough surface first contacts the first sheet as the zero drum position (i.e. $\phi=0°$), we can write an equation which specifies that the smooth surface is in contact with the second sheet when the first sheet exits the printer.

$$L_f = (360k + \beta + \theta_2)\cdot\frac{\pi D_d}{360} \quad (3)$$

The above equation states that the position of the drum when the first sheet leaves the cassette should be some number of full revolutions (which would bring the gripper surface back to its zero position) plus the angle $\beta$ required to rotate the drum past the gripper surface and onto the slider surface plus the factor of safety $\theta_2$. (Note: k is one less than the number of drum revolutions per sheet feed period, j.)

Because it is desired that the rough platen surface not come into contact with the second sheet until the first sheet has exited the printer beyond the egress roller, the angular position of the platen when the paper exits the printer should be less than or equal to the next highest full revolution. Since the next highest number of full revolutions is j, we can write:

$$j \geqq (360k + \beta + \chi + \theta_3)/360 \quad (4)$$

or $$j = (360n + \chi + \theta_3)/360 \quad (5)$$

The number of revolutions the platen makes to feed a sheet from the stack is related to the feed length of paper $L_f$ by the following:

$$n = L_f/\pi D_d, \text{ or } n = k + (\beta - \theta_1)/360 \quad (6)$$

and;

$$L_e = \pi D_d \chi / 360 \quad (7)$$

where $L_e$ is the linear distance the first sheet travels between the stack and the egress roller therefore;

$$j = (L_f + L_e + \pi D_d \theta_3/360)/\pi D_d \quad (8)$$

$(L_f + L_e)$ is the total sheet feed length which can be rewritten to give the drum diameter:

$$D_d = (L_f + L_e + \pi D_d \theta_3/360)/\pi j \quad (9)$$

or;

$$D_d = (L_f + \pi D_d(\chi + \theta_3)/360)/\pi j \quad (10)$$

reducing (10) gives:

$$D_d = (L_f/\pi j)/(1 - (\chi + \theta_3)/360 j); \text{ or} \quad (11)$$

$$D_d = 360 \cdot L_f/\pi(360j - \chi - \theta_3) \quad (12)$$

There are certain physical factors which should be considered when determining the number of drum revolutions to be utilized in a complete cycle of sheet feed. Thus:

- $D_d$—Should be large enough so that paper can be wrapped around the platen without creasing or causing other difficulties.
- $L_b$—Should be large enough to allow the paper to easily buckle but small enough so that buckler plate does not interfere with carriage operation.
- $\alpha$—Should be such that bail arm rollers do not interfere with carriage operation.
- $\chi$—Should be such that egress rollers do not interfere with carriage operation.
- $\chi + \beta + \theta_3$—Not be greater than 360°.

EXAMPLE

If we select a two revolution sheet feed platen for an 11" sheet we know the following:

$j=2$ $k=1$ $L_p=11''$

We know that a two revolution sheet feeder will have a reasonably large platen which allows us to get a reasonable estimate of the variables $L_b$, $\alpha$ and $\chi$.

$\alpha=45°$ $\chi=180°$ $L_b=0.5''$ $\theta_1=\theta_2=\theta_3=5°$

From this we can determine the platen diameter.

$$D_d = ((11-0.5)/2\pi)/(1-(180+5)/720)$$

$$D_d = 2.249''$$

$$\beta = 360(\pi(2.249(45°)/360° - 0.5)/(\pi(2.249)) + (\theta_1 = 5°) \simeq 25°$$

Verify Equation (3):

$$L_f = (360k + \beta + \theta_2) \cdot \frac{\pi D_d}{360} = 7.65''.$$ This is less than $(L_f = 10.5'')\sigma\theta_2$ is $>5°$.

One final check is made to insure that $\beta + \chi + \theta_3$ is less than 360° to satisfy all of our conditions.

$$25° + 180° + (\theta_3 = 5°) = 210° < 360°.$$

Therefore such a platen will work.

As another general example consider the two revolution system in accord with the present invention such as shown in FIGS. 3–5. Such a system constructed for handling sheets of 11" length and having a feed ring diameter of about 2.2" will function properly. More particularly, the contact point A is located rearwardly 0.5" from the front of the stack so this ring diameter yields an interspace between sheets of about 3.3":

2.2 diameter $\times \pi \times 2$ revolutions
$\simeq$13.8" effective circumference
13.8" effective circumference − 10.5"
feed length $\simeq$3.3 interspace Such an interspace can accommodate the desired condition for allowing the trailing edge of a feed sheet to exit the nip of pressure roller 23 before commencement of a next successive sheet feed. That is, selection of the circumference arc of the rough portions to be about 150° will provide a rough surface circumference of about 2.9" that is adequate to effect transmission of the leading sheet edge to the bail nip when located as shown in FIGS. 3–5. Also, the resultant smooth portion circumference (i.e. 210°) is more than adequate to feed a next subsequent sheet prior the trailing end of the preceding sheet exiting the nip of pressure roller 22. Also, as shown in FIG. 5, the lid pressure roller 37 can continue feed of the sheet S toward the output tray 39 and the lid 37 can be opened to remove that sheet should operation then cease, at the FIG. 1 stage, without a next sheet feed.

Figure 7:
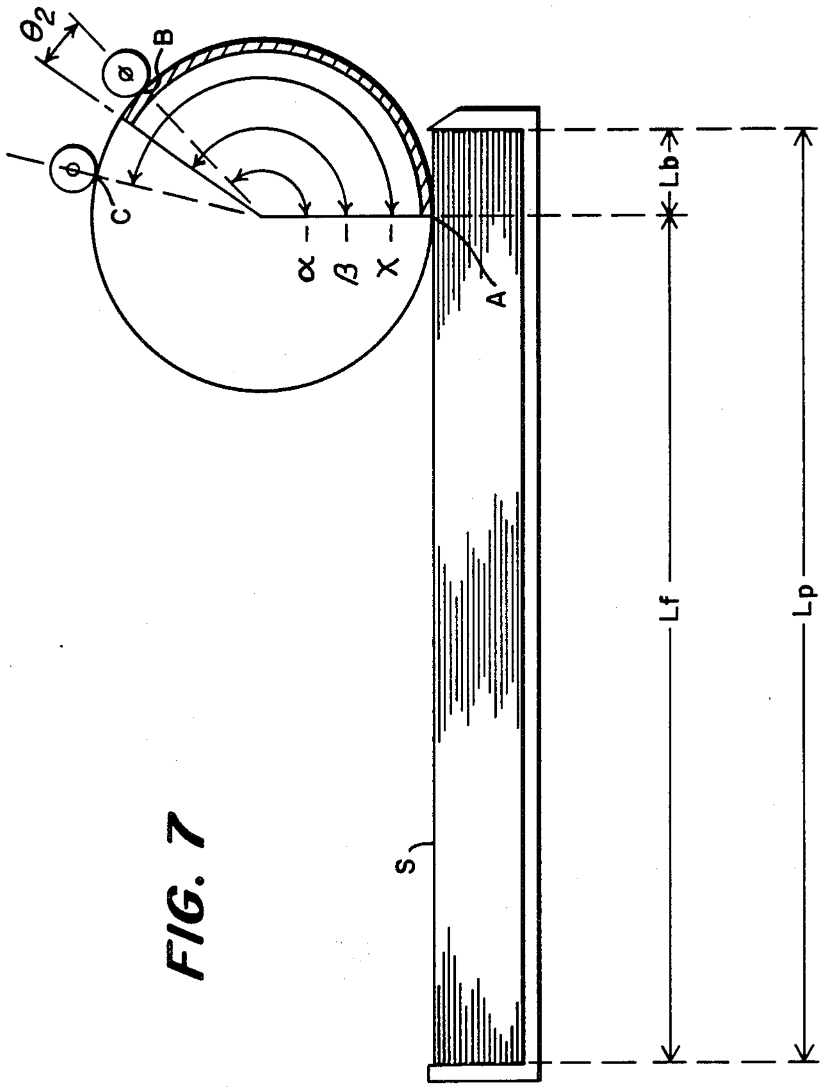
FIG. 7 is a diagram useful for explaining different embodiment designs in accord with the present invention.

In another embodiment the invention can be implemented in one revolution of the platen. Exemplary parameters for such an embodiment are, for an 11" length sheet:

$\alpha=45°$ $\chi=180°$ $L_b=0.75''$ $\theta_1=\theta_2\theta_3=5°$ $D_d=6.712''$ $\beta=37°$ In another preferred embodiment the invention can be implemented in four revolutions of the platen, by locating the pressure roller closer to the contact point as shown in FIG. 7. Exemplary parameters for such an embodiment are, for an 11" sheet:

$\alpha = 45°$ $\chi = 180°$ $L_b = 0.25''$ $\theta_1 = \theta_2 = \theta_3 = 5°$ $D_d = 0.982''$ $\beta = 21°$ This embodiment affords the advantages of enhancing compactness.

It will be appreciated that the inventive approach of utilizing a common member to effect sheet feeding from a stack, transport to and through a print zone and egress of a printed sheet into an output tray can be implemented in various other apparatus configurations. For example, the common member can comprise an endless belt having smooth or rough surface portions analogous to the illustrated embodiments. Or, the means for effecting periodic feeding engagements between the common member and the sheet stack can embody a cam or solenoid actuated system for periodically raising and lowering the force plate.

Figure 8:
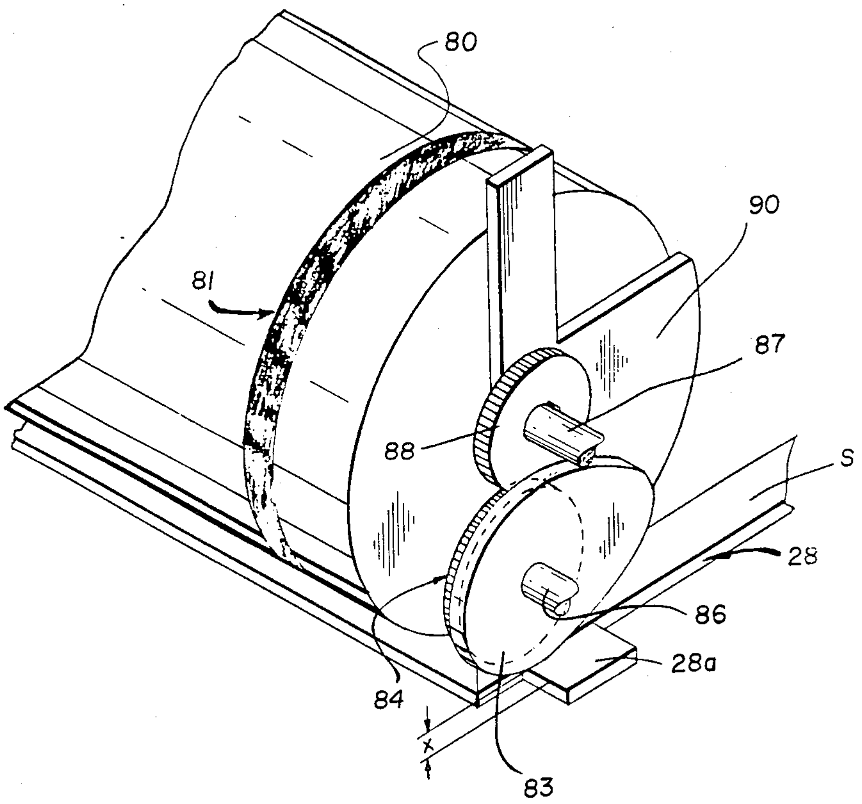
FIG. 8 is a perspective view showing an alternative embodiment of the present invention.

One such alternative embodiment is shown in FIG. 8. In this embodiment the platen 80 has frictional gripper surfaces 81 at each end which extend around its entire periphery. As in the previously described embodiment, force plate 28 is urged upwardly, e.g. by spring means, and includes a tab 28*a* which can be utilized to depress the force plate (e.g. via cam lever 90) for platen indexing to a zero position. However, in the FIG. 8 embodiment, tab 28*a* is also operated upon by an engagement sequencing cam 83. As shown, sequencing cam 83 is affixed to rotate with a cam gear 84 and both are mounted for rotation on an idler shaft 86. To effect proper related rotation of cam 83, the platen drive shaft 87 has an affixed drive gear 88 which intermeshes with cam gear 84. The camming surface of cam 83 is constructed and located to depress and release tab 28*a* during its rotation so that sheets on the force plate 28 are cyclically moved into and out of feeding engagement with the gripper surfaces 81 on platen 80. The profile of cam 83 and the ratio of gears 84, 88 are selected so that the engagements between a tip stack sheet and the surfaces 81 occur at the same platen rotational stages as described above with respect to the rough surface portions 25*a* of the FIGS. 1–7 embodiments. At the stage shown in FIG. 8, the cam 83 is in a sheet feeding position of its rotation and there exists a spacing "x" between its lower face and tab 28*a*. This allows the force plate 28 to move its supported sheets into engagement with gripper surface 81.

While the disclosed embodiments of the present invention describe simplified constructions and methods for control of the platen indexing and feed sequencing, more complete control systems useful with the present invention are described in concurrently filed now U.S. Pat. No. 4,728,966, entitled "Printer/Feeder Having Integral Control System" by Piatt et al, which is incorporated herein by reference.

The invention has been described in detail with particular reference to preferred embodiments thereof, but it will be understood that variations and modifications can be effected within the spirit and scope of the invention.

I claim:

1. In printer apparatus of the kind having a housing, a print zone and means for printing across sectors of print media that are successively advanced into and out of said print zone, an improved construction for handling discrete sheets of print media comprising:

(a) a sheet-feeding and recording-transport member having a high-friction, peripheral surface sector that is movable around an endless path past a sheet-feed zone, a sheet ingress zone, the print zone and a sheet egress zone;

(b) drive means for moving said member so that said surface sector moves around said endless path;

(c) a sheet supply station formed within said housing and including means for positioning a stack of print media sheets with a face sheet at said sheet-feed zone; and (d) engagement means for effecting periodic feeding contact between said high-friction surface sector and successive face sheets of a positioned stack.

2. The invention defined in claim 1 wherein said engagement means comprises raised portions of said surface sector that are constructed to protrude into said supply station, said raised portions extending along only a portion of said feeding and transport member periphery.

3. The invention defined in claim 2 wherein said raised portions are constructed to frictionally engage sheet media when in opposition thereto and wherein said feeding and transport member comprises raised low friction peripheral portions, located intermediate said high friction portions and constructed to slide over opposing sheet media.

4. The invention defined in claim 3 wherein the entire peripheral dimension of said feeding and transport member and the length of said high friction sector have a predetermined relation to the feed-direction dimension of the sheet media such that: (i) as the trailing edge of a sheet exits said egress zone, said low friction portions engage the next face sheet in said supply station and (ii) thereafter said high friction sector moves into contact to engage and feed the next face sheet toward said print zone.

5. The invention defined in claim 1 further including biasing means location between said ingress and egress zones for forcing a fed sheet moving therepast into a drive transmission relation with said feeding and transport member.

6. The invention defined in claim 5 wherein said engagement means comprises raised portions on said member surface extending over a periphery length equal to or greater than the distance along said feed path from the point of initial feeding contact to the location of said biasing means.

7. The invention defined in claim 6 further including guide means for guiding fed sheet media into a closely opposing relation with said member surface during its movement from said sheet supply station to said media egress zone.

8. In printer apparatus of the kind having a housing, a print zone and means for printing across sectors of print media that are successively advanced into and out of said print zone, an improved construction for handling discrete sheets of print media comprising:

(a) a cylindrical feeding and transport platen which is rotatable within said housing so that portions of its periphery move successively through a sheet feed zone, a sheet ingress zone, said print zone and a sheet egress zone;

(b) drive means for rotating said platen;

(c) a sheet supply station formed within said housing, and including means for supporting a stack of such sheets with a face portion of the stack top opposing said feeding and transport platen at said sheet feed zone, upstream of said ingress zone; and (d) a pair of frictional feed ring sectors located around only portions of the end peripheries of said platen and constructed to protrude into feeding contact with a face sheet of said stack during movement therepast, whereby the top sheets of a supported stack are fed sequentially toward said print zone by the periodic passages of said ring sectors across said stack.

9. The invention defined in claim 8 wherein said supporting means is movable toward and away from said platen and including means for urging said movable means toward said platen.

10. The invention defined in claim 8 further comprising at least one circumferential friction band extending around, and approximately flush with, the periphery of said platen and at least one clamp roller located to press a fed sheet against said band at a location downstream from said ingress zone.

11. The invention defined in claim 10 wherein said ring sectors have a peripheral length at least from location of initial contact with supported sheets to said clamp roller, whereby feed of a sheet is effected first by said ring sectors and then by said clamp roller/friction band transmission.

12. The invention defined in claim 11 further comprising guide means for retaining a fed sheet in close proximity to said platen during passage from said stack to said clamp roller.

13. The invention defined in claim 11 wherein the circumference of said platen is a multiple of the quantity S.F.D.+S, where the sheet feed distance S.F.D. is equal to the distance from the point of initial contact between the stack and ring sectors to the trailing edge of stacked sheets and where the sheet space factor S is the space between the trailing edge of one fed sheet and the leading edge of the next fed sheet.

14. The invention defined in claim 11 wherein the circumference of said platen has a predetermined relation to the sheet feed length such that the trailing edge of a feed sheet has passed said egress zone prior to rotation of the leading portion of said feed ring sectors moving into contact with the next-to-be-fed sheet of said stack.

15. In printer apparatus of the kind having a housing, a print zone and means for printing across sectors of print media that are successively advanced into and out of said print zone, an improved construction for handling discrete sheets of print media comprising:

(a) a sheet supply station formed within said housing and including means for positioning a stack of sheets with the stack face at a position upstream of said print zone ingress;

(b) a transport platen and sheet feed member having a feed surface that is movable around an endless path that extends over said sheet supply station and, then successively, to said print zone ingress, to said print zone and to a sheet egress zone;

(c) drive means for moving said feed surface around said endless path; and (d) means for urging feed engagement between said feed surface and successive face sheets of a positioned stack, whereby said member effects both sheet feed from the supply stack and transport of fed sheets to and through said print zone.

16. The invention defined in claim 15 wherein said feed surface includes portions constructed to protrude into said supply station and extend along only a portion of said endless path.

17. The invention defined in claim 16 wherein said feed surface portions are constructed of high frictional material and wherein said feed surface comprises low friction portions constructed between the lead and trail ends of said high friction portions.

18. The invention defined in claim 17 wherein the entire path dimension of said transport and feed member and said path-length dimension of said high friction portions have a predetermined relation to the feed-direction dimension of the sheet media such that: (i) as the trailing edge of a sheet exits said egress zone, said low friction portions are in contact with the next face sheet in said supply station and (ii) thereafter said high friction portions move into contact to engage and feed the next face sheet toward said print zone.

19. The invention defined in claim 17 further including biasing means located between said ingress and egress zones for forcing a fed sheet moving therepast into a drive transmission relation with said feed surface and wherein said high friction portions extend over a sector of said feed path that is equal to or greater than the distance, along said feed path from the point of initial feeding engagement to the location of said biasing means.

20. The invention defined in claim 15 wherein said feed surface comprises a high friction portion extending along its entire endless path length and said urging means includes feed control means for effecting periodic contact between said stack and said high friction feed surface portion.

21. The invention defined in claim 20 wherein said urging means includes spring means biasing a sheet stack toward said feed surface and said feed control means comprises a cam member movable in synchronism with said feed surface for periodically enabling said spring means.

22. In printer apparatus of the kind having a housing, a print zone and means for printing across sectors of print media that are successively advanced into and out of said print zone, an improved construction for handling discrete sheets of print media comprising:

(a) a cylindrical transport platen which is rotatable within said housing so that its periphery portions move successively from a feed zone through a sheet ingress zone, said print zone and a sheet egress zone;

(b) drive means for rotating said platen;

(c) a sheet supply station formed within said housing, and including means for supporting a stack of such sheets with the stack top opposing said transport platen at said feed zone; and (d) means for effecting periodic sheet-feed contacts between said platen and said sheet stack.

23. The invention defined in claim 22 wherein said periodic contact effecting means comprises means for urging a supported sheet stack toward said platen and high friction feed surface means constructed, around only a portion of the peripheries of said platen, to protrude into feeding contact with face sheets of such stack during movement therepast, whereby successive top sheets of such supported stack are fed periodically toward said print zone by the periodic passages to said platen feed surface means across said stack.

24. The invention defined in claim 22 wherein said platen includes high friction surface means extending substantially completely around its periphery and said means for effecting periodic sheet feed contacts includes means for periodically moving a supported sheet stack into and out of face-sheet-contact with said high friction surface means of said platen.

* * * * *